(12) United States Patent
Cha et al.

(10) Patent No.: US 8,789,865 B2
(45) Date of Patent: Jul. 29, 2014

(54) STORAGE APPARATUS FOR VEHICLE

(75) Inventors: Dong Eun Cha, Seongnam-si (KR); Seung Mok Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/323,512

(22) Filed: Dec. 12, 2011

(65) Prior Publication Data

US 2013/0088035 A1  Apr. 11, 2013

(30) Foreign Application Priority Data

Oct. 5, 2011 (KR) .................. 10-2011-0101155

(51) Int. Cl.
*B60R 11/00* (2006.01)
*B60R 19/48* (2006.01)
*B60R 7/02* (2006.01)

(52) U.S. Cl.
CPC .. *B60R 19/48* (2013.01); *B60R 7/02* (2013.01)
USPC ......................................... 293/106; 296/37.1

(58) Field of Classification Search
CPC ..................................................... B60R 17/02
USPC ........................................ 296/37.1; 293/106
See application file for complete search history.

(56) References Cited

U.S. PATENT DOCUMENTS

| | | | |
|---|---|---|---|
| 2,490,014 A | 12/1949 | Brand | |
| 2,545,269 A | 3/1951 | Ford | |
| 2,953,287 A | 9/1960 | Werner | |
| 4,089,554 A * | 5/1978 | Myers | 296/37.1 |
| 4,312,620 A | 1/1982 | Muschalek, Jr. | |
| 4,570,986 A | 2/1986 | Sams | |
| 4,676,415 A | 6/1987 | Kennedy | |
| 5,135,274 A | 8/1992 | Dodd | |
| 5,301,992 A | 4/1994 | Whitmore | |
| 5,823,585 A | 10/1998 | Tanguay | |
| 6,196,612 B1 | 3/2001 | Grimes | |
| 6,474,715 B2 | 11/2002 | Fukushima et al. | |
| 6,575,509 B1 * | 6/2003 | Golden | 293/119 |
| 6,644,707 B2 * | 11/2003 | McLaughlin et al. | 296/26.09 |
| 7,111,884 B2 | 9/2006 | Johnson | |
| 7,121,597 B2 | 10/2006 | Chuang | |
| 7,281,745 B1 | 10/2007 | Meinke et al. | |

(Continued)

FOREIGN PATENT DOCUMENTS

| | | |
|---|---|---|
| DE | 195 38 734 A1 | 5/1996 |
| DE | 101 24 375 C1 | 11/2002 |

(Continued)

*Primary Examiner* — Glenn Dayoan
*Assistant Examiner* — Melissa A Black
(74) *Attorney, Agent, or Firm* — Morgan, Lewis & Bockius LLP (57) ABSTRACT

A storage apparatus for a vehicle may include a left rear back beam and a right rear back beam divided while sliding to left and right sides in a traverse direction of the vehicle, respectively when the left rear back beam and the right rear back beam may be drawn out from a rear bumper while sliding to a rear side of the vehicle in a longitudinal direction thereof, and a left storage box and a right storage box installed to be fixed to the left and right rear back beams, respectively, to be drawn out together when the left and right rear back beams may be drawn out to the rear side of the vehicle and divided together when the left and right rear back beams slide to the left and right sides of the vehicle.

9 Claims, 6 Drawing Sheets

(56) References Cited

U.S. PATENT DOCUMENTS

| | | |
|---|---|---|
| 7,347,474 B2 | 3/2008 | Shagbazyan |
| 8,256,807 B2 | 9/2012 | Lucas |
| 8,302,829 B2 | 11/2012 | Lee et al. |
| 2002/0105201 A1 | 8/2002 | Melotik et al. |
| 2007/0102465 A1 | 5/2007 | Wezyk et al. |
| 2008/0006667 A1 | 1/2008 | Bergerhoff et al. |
| 2008/0179907 A1 | 7/2008 | Medlar et al. |

FOREIGN PATENT DOCUMENTS

| | | |
|---|---|---|
| JP | 2001-334879 A | 12/2001 |
| JP | 2007-245959 A | 9/2007 |
| JP | 4332827 B2 | 7/2009 |

* cited by examiner

STORAGE APPARATUS FOR VEHICLE

CROSS-REFERENCE TO RELATED APPLICATION

The present application claims priority to Korean Patent Application No. 10-2011-0101155 filed on Oct. 5, 2011, the entire contents of which is incorporated herein for all purposes by this reference.

BACKGROUND OF THE INVENTION

1. Field of the Invention

The present invention relates to a storage apparatus for a vehicle, and more particularly, to a storage apparatus for a vehicle that can store a luggage by using an inner space of a rear bumper or can be used as a step and a bench.

2. Description of Related Art

Figure 1:
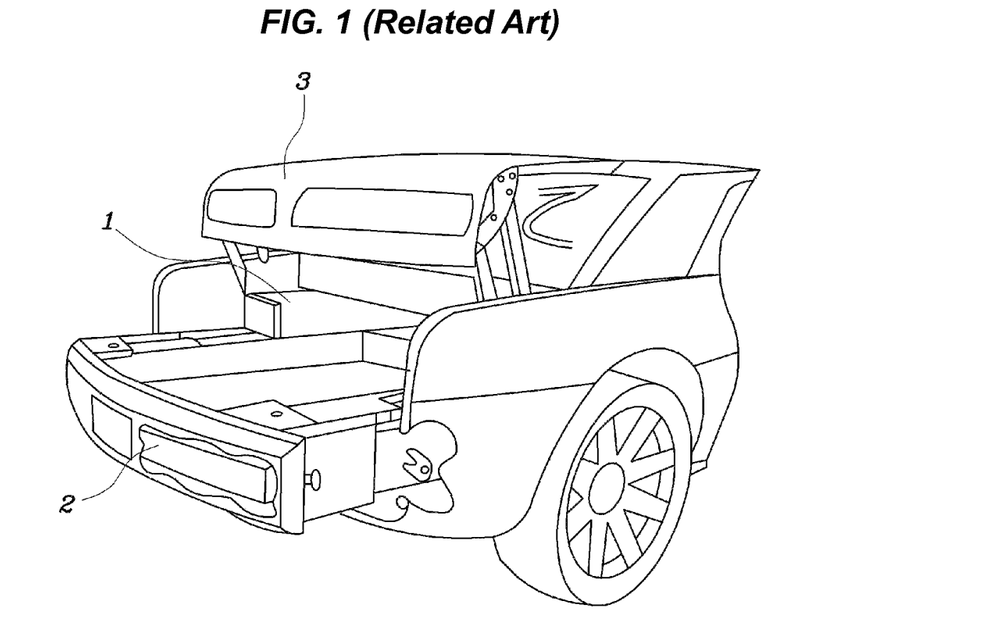
FIGS. 1 and 2 are diagrams for describing a vehicle storage apparatus in the related art.

FIG. 1 shows a vehicle with a storage box 2 provided in a space of a trunk room 1. A known structure of FIG. 1 as a structure of drawing out the storage box 2 by opening a trunk rid 3 has inconvenience depending on opening and closing operations of the trunk rid 3 and has a disadvantage in which the space of the trunk room 1 may be contaminated by moisture and in particular, has a disadvantage in which the inner space of the rear bumper corresponding to a spare space cannot be used as a storage structure.

In addition, in a known storing structure shown in FIG. 2 as a structure in which a rear bumper 11 is used as a door of a storing space 12, the rear bumper 11 is opened and thereafter, an article 13 can be stored in the storing space 12 provided below the vehicle.

Figure 2:
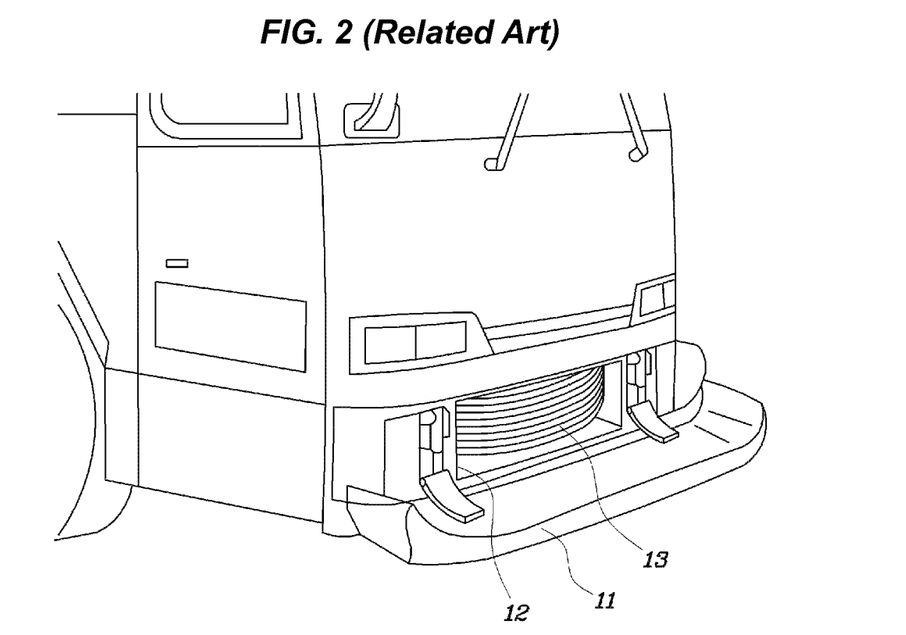

However, in the known structure of FIG. 2 as a structure in which the rear bumper 11 is used as the door of the storing space 12, the inner space of the rear bumper 11 corresponding to the spare space cannot be used as the storing structure like the known structure of FIG. 1.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a storage apparatus for a vehicle that can use an inner space of a rear bumper corresponding to a spare space of the vehicle as a storing structure to actively use the spare space of the vehicle and in particularly, can easily store an article having a large length by extending a drawn out storage box and furthermore, can use an opened storage box as a step and a bench.

In an aspect of the present invention, a storage apparatus for a vehicle, may include a left rear back beam and a right rear back beam divided while sliding to left and right sides in a traverse direction of the vehicle, respectively when the left rear back beam and the right rear back beam are drawn out from a rear bumper while sliding to a rear side of the vehicle in a longitudinal direction thereof, and a left storage box and a right storage box installed to be fixed to the left and right rear back beams, respectively, to be drawn out together when the left and right rear back beams are drawn out to the rear side of the vehicle and divided together when the left and right rear back beams slide to the left and right sides of the vehicle.

The storage apparatus for the vehicle may further include a power transmitting device fixed to a rear floor panel and a rear side member and installed to be connected with the left and right rear back beams to enable the left and right rear back beams to slide in forward and backward directions of the vehicle and the left and right rear back beams to slide in the left and right direction.

The left and right storage boxes may include lower plates fixed onto the left and right rear back beams, respectively, lower trays fixed onto the lower plates and having a space for storing articles, which is provided therein, upper trays rotatably coupled to the lower tray to open/close the lower trays, and tray covers integrally coupled to the upper trays.

The storage apparatus for the vehicle may further include a plurality of link members of which both ends are hinge-coupled to both sides of the lower trays and the upper trays, respectively.

The power transmitting device may include a pair of guide rails installed to be fixed onto a bottom surface of the rear floor panel at the left and right sides of the vehicle, respectively, a shift bar installed with both ends coupled to the pair of guide rails to slide in forward and backward directions on the pair of guide rails, a left link and a right link of which ends are hinged-coupled to the shift bar and the other ends are hinge-coupled to the left and right rear back beams, respectively, a pair of fixation frames integrally coupled to a rear end of the rear side member in the longitudinal direction of the rear side member, a pair of frame cases installed to slidably cover the fixation frames and slidably connected with the left and right rear back beams, respectively to move in the forward and backward direction on the fixation frames when the left and right rear back beams slide in the forward and backward directions and guide the left and right-direction slidings of the left and right rear back beams when the left and right rear back beams slide in the left and right directions on the frame cases, and a rear stopper integrally protruded on a side surface of the fixation frames and restraining rear movement of the frame cases.

The ends of the left and right links are hinge-coupled to a middle point of the shift bar and the other ends of the left and right links are installed to be hinge-coupled to the left and right rear back beams, respectively while maintaining the wider interval than the ends.

The left rear back beam and the right rear back beam are bent with a predetermined curvature with respect to the middle point of the shift bar.

A front stopper restraining a front movement of the frame cases integrally protrudes on a front end of the fixation frames.

Back beam flanges bent in upper and lower direction are integrally formed on upper and lower ends of the left and right rear back beams, respectively, and a case flange slidably covering the back beam flanges is integrally formed on upper and lower ends of the frame case to guide the left and right-direction slidings of the left and right rear back beams.

The tray covers that rotate to the rear side of the vehicle are usable as a step or a bench.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that may have two or more sources of power, for example both gasoline-powered and electric-powered vehicles.

The methods and apparatuses of the present invention may have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a storage apparatus for a vehicle according to an exemplary embodiment of the present invention will be described with reference to the accompanying drawings.

The storage apparatus for the vehicle according to the exemplary embodiment of the present invention as a structure using an inner space 22 of a vehicle rear bumper 21 corresponding to a spare space as shown in FIGS. 3 to 10 includes a left rear back beam 30 and a right rear back beam 40 divided while sliding to left and right sides of the vehicle, respectively when the left rear back beam 30 and the right rear back beam 40 are drawn out from a rear bumper 21 while sliding to the rear side of the vehicle and a left storage box 50 and a right storage box 60 installed to be fixed to the left and right rear back beams 30 and 40 to be drawn out together when the left and right rear back beams 30 and 40 are drawn out to the rear side of the vehicle and divided together when the left and right rear back beams 30 and 40 slide to the left and right sides of the vehicle.

Further, the storage apparatus according to the exemplary embodiment of the present invention further includes a power transmitting device 70 fixed to a rear floor panel 23 and a rear side member 24 and installed to be connected with the left and right rear back beams 30 and 40 to enable the left and right rear back beams 30 and 40 to slide in forward and backward directions and the left and right rear back beams 30 and 40 to slide in the left and right direction.

Herein, the left and right storage boxes 50 and 60 include lower plates 51 and 61 fixed onto the left and right rear back beams 30 and 40, respectively, lower trays 52 and 62 fixed onto the lower plates 51 and 61 and having a space for storing articles, which is provided therein, upper trays 53 and 63 rotatably coupled to the lower tray 52 and 62 to open/close the lower trays 52 and 62, and tray covers 54 and 64, and tray covers 54 and 64 integrally coupled to the upper trays 53 and 63.

The lower plates 51 and 61 are adopted to reinforce the stiffness of the lower trays 52 and 62 and in particular, when the lower plates 51 and 61 and the lower trays 52 and 62 are coupled to be separated from each other, the lower trays 52 and 62 can be easily repaired and cleaned.

In the exemplary embodiment of the present invention, a plurality of link members 55 and 65 are adopted to rotate the upper trays 53 and 63, and as a result, both ends of each of the link members 55 and 65 are hinge-coupled to both sides of the lower trays 52 and 62 and the upper trays 53 and 63, respectively.

Meanwhile, the power transmitting device 70 includes a pair of guide rails 71 installed to be fixed onto the bottom surface of the rear floor panel 23 at the left and right sides of the vehicle, respectively with both ends placed in the forward and backward directions of the vehicle, a shift bar 72 installed with both ends connected to the pair of guide rails 71 to slide in forward and backward directions on the pair of guide rails 71, a left link 73 and a right link 74 of which ends are hinged-coupled to the shift bar 72 and the other ends are hinge-coupled to the left and right rear back beams 30 and 40, respectively, a pair of fixation frames 75 integrally coupled to a rear end of the rear side member 24 in the longitudinal direction of the rear side member 24, a pair of frame cases 76 installed to cover the fixation frames 75 and connected with the left and rear back beams 30 and 40, respectively to move in the forward and backward direction on the fixation frames 75 when the left and right rear back beams 30 and 40 slide in the forward and backward directions and guide the left and right-direction sliding of the left and right rear back beams 30 and 40 when the left and right rear back beams 30 and 40 slide in the left and right directions, and a rear stopper 77 integrally protruded on the side surface of the fixation frame 75 to restrain rear movement of the frame case 76.

Herein, the ends of the left and right links 73 and 74 are hinge-coupled to a middle point of the shift bar 72 and the other ends of the left and right links 73 and 74 are installed to be hinge-coupled to the left and right rear back beams 30 and 40, respectively while maintaining the wider interval than the ends.

Due to the coupling structure of the left and right links 73 and 74, the left and right rear back beams 30 and 40 extend while sliding in the left and right directions of a vehicle body when the shift bar 72 moves to the rear side.

In addition, a front stopper 78 restraining front movement of the frame case 76 integrally protrudes on a front end of the fixation frame 75.

That is, when the frame case 76 coupled with the left and right rear back beams 30 and 40 moves with respect to the fixation frame 75 to the rear side of the vehicle, the rear stopper 77 restrains the rear movement of the frame case 76 and when the frame case 76 moves to the front side of the vehicle, the front stopper 78 constrains the front movement of the frame case 55.

Figure 7:
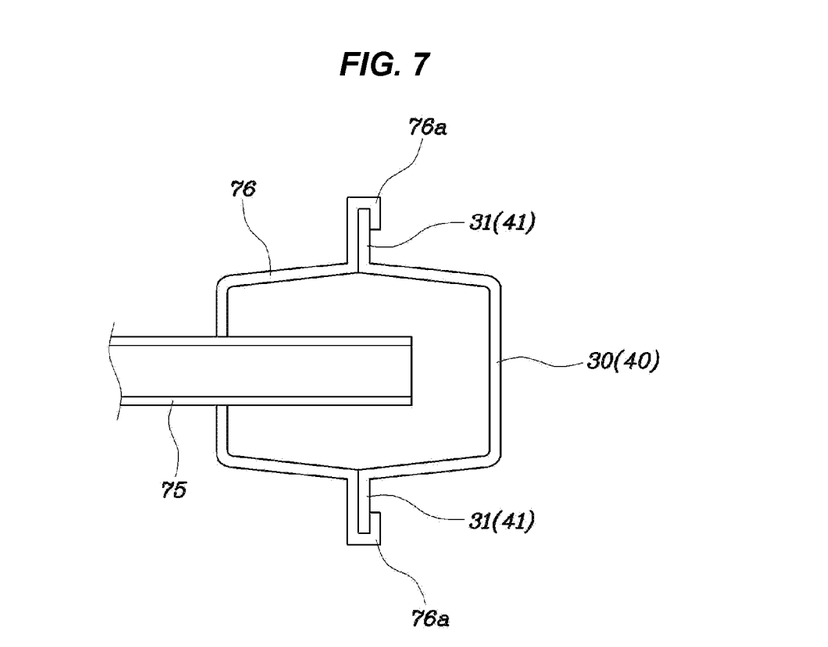
FIG. 7 is a cross-sectional view for describing a coupling structure of left and right rear back beams and a frame case in the storage apparatus according to the exemplary embodiment of the present invention.

Further, in order for the left and right rear back beams 30 and 40 to slide in the left and right direction of the vehicle, back beam flanges 31 and 41 bent in upper and lower direction are integrally formed on upper and lower ends of the left and right rear back beams 30 and 40, respectively and a case flange 76a covering the back beam flanges 31 and 41 is integrally formed on upper and lower ends of the frame case 76 to guide the left and right-direction sliding of the left and right rear back beams 30 and 40.

Figure 10:
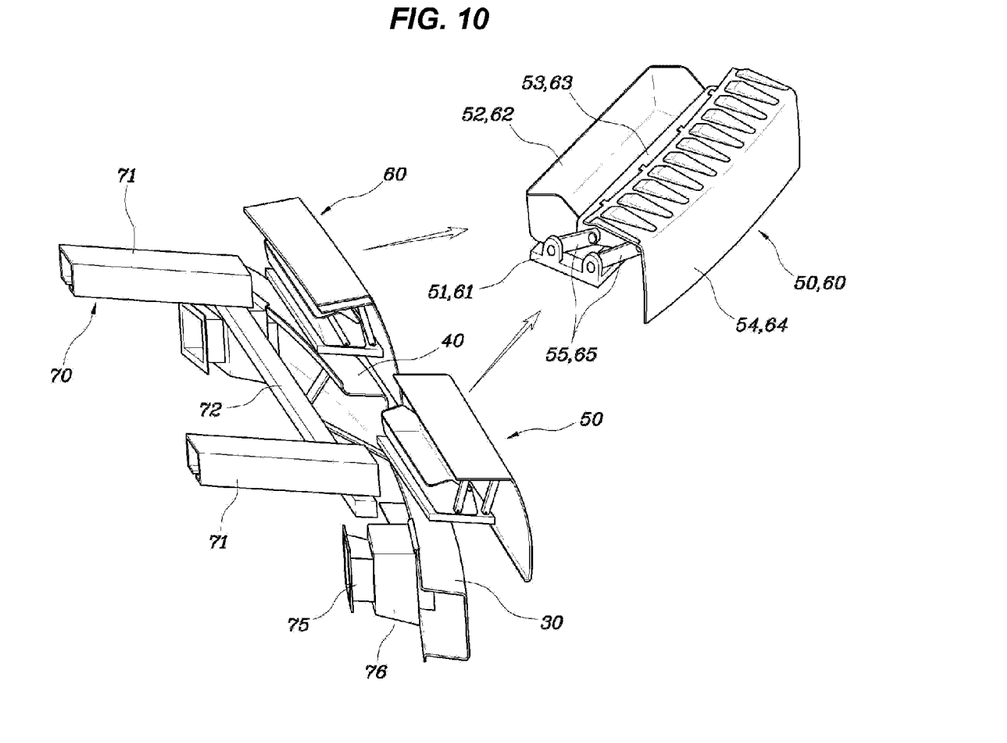
FIG. 10 is an operational diagram when a tray cover rotates to the rear side in the storage apparatus according to the exemplary embodiment of the present invention.

In addition, in the storage apparatus according to the exemplary embodiment of the present invention, when the upper trays 53 and 63 and the tray covers 54 and 64 rotate to the rear side as shown in FIG. 10 to open the lower trays 52 and 62, the tray covers 54 and 64 may be used as a step or a bench.

Undescribed reference numeral 25 represents a trunk rid or a tailgate and undescribed reference numeral 26 represents a rear end panel.

Hereinafter, an operation of the storage apparatus according to the exemplary of the present invention will be described.

Figure 3:
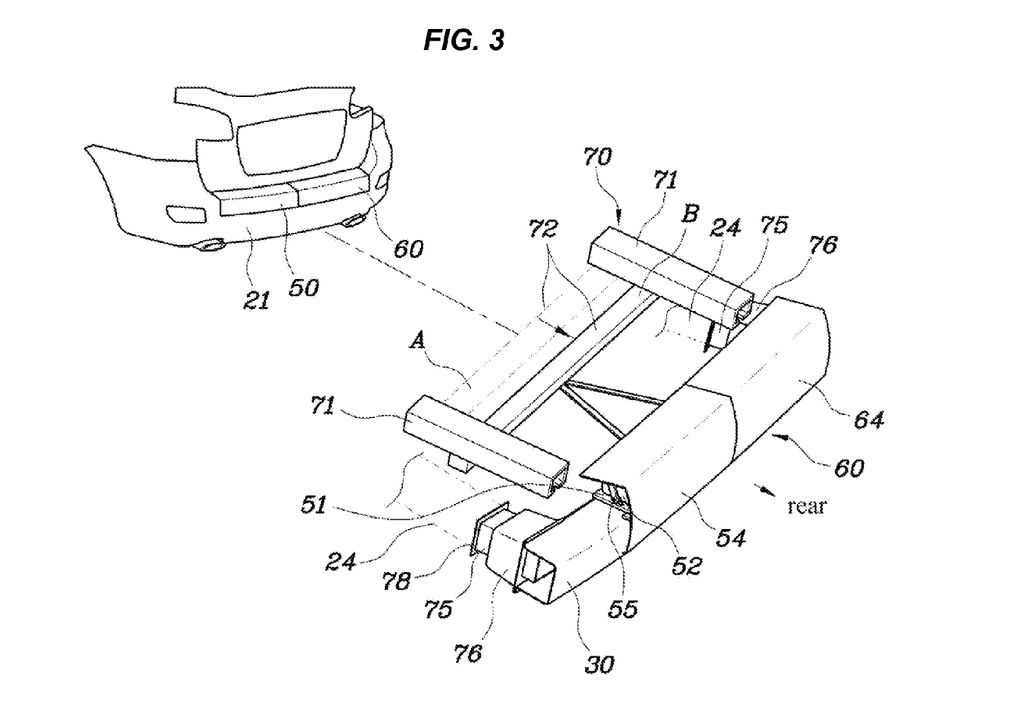
FIG. 3 is a perspective view of a storage apparatus according to an exemplary embodiment of the present invention.
Figure 6:
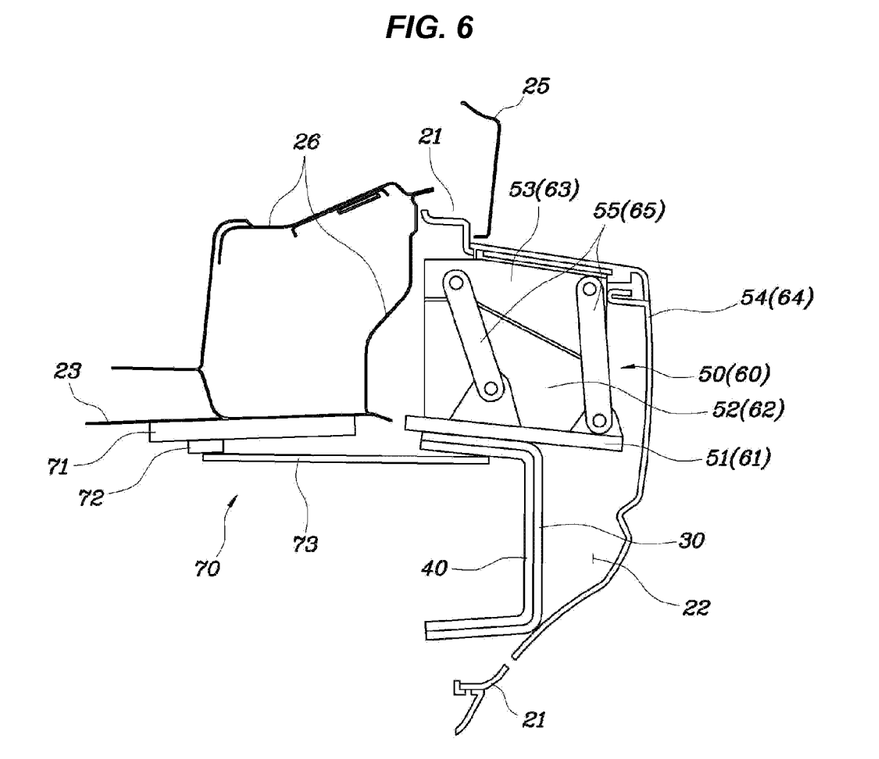
FIG. 6 is a cross-sectional view of FIG. 3.

In a left diagram of FIG. 3 and a diagram of FIG. 6, when the left and right storage boxes 50 and 60 are stored in the inner space 22 of the rear bumper 21 corresponding to the spare space of the vehicle, the upper trays 53 and 63 seal the lower trays 52 and 62. In this case, desired articles can be stored and kept in inner spaces of the lower trays 52 and 62.

In the above state, rotational operations of the upper trays 53 and 63 and the tray covers 54 and 64 are restrained by an additional locking device (not shown).

Further, as shown in FIG. 6, when the left and right storage boxes 50 and 60 are stored in the inner space 22 of the rear bumper 21, the shift bar 72 maintains state A expressed by dotted lines in FIG. 3 and the frame case 76 maximally moves to the front side, and as a result, the frame case 76 is in contact with the front stopper 78.

In addition, when external force acts on the rear bumper 21 due to a rear collision accident under the state shown in FIG. 6, the rear bumper 21 may absorb impacts while the left and right storage boxes 50 and 60 according to the exemplary embodiment of the present invention are collapsed by the external force, and as a result, the left and right storage boxes 50 and 60 according to the exemplary embodiment of the present invention may have even an impact absorbing function for protecting passengers.

Figure 4:
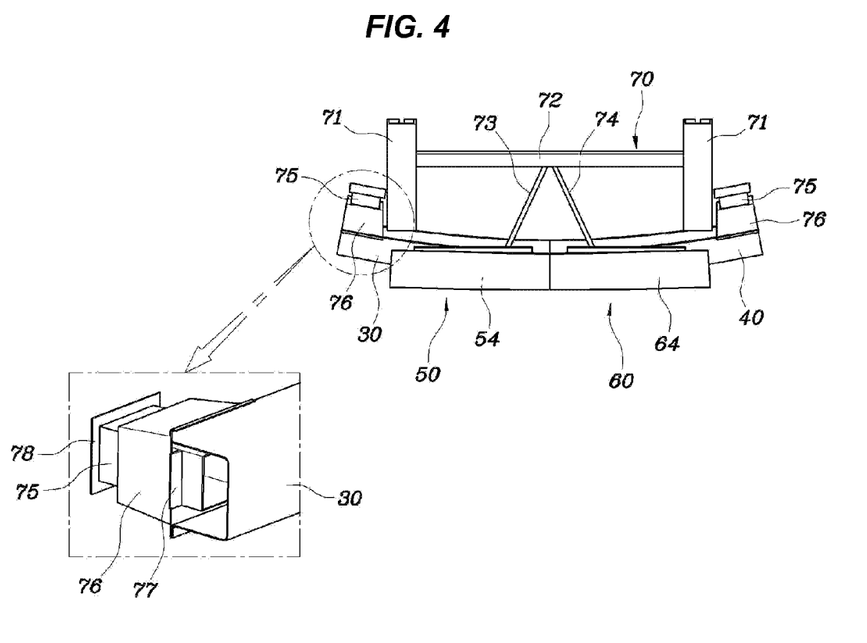
FIGS. 4 and 5 are a plan view and a bottom view of FIG. 3.
Figure 5:
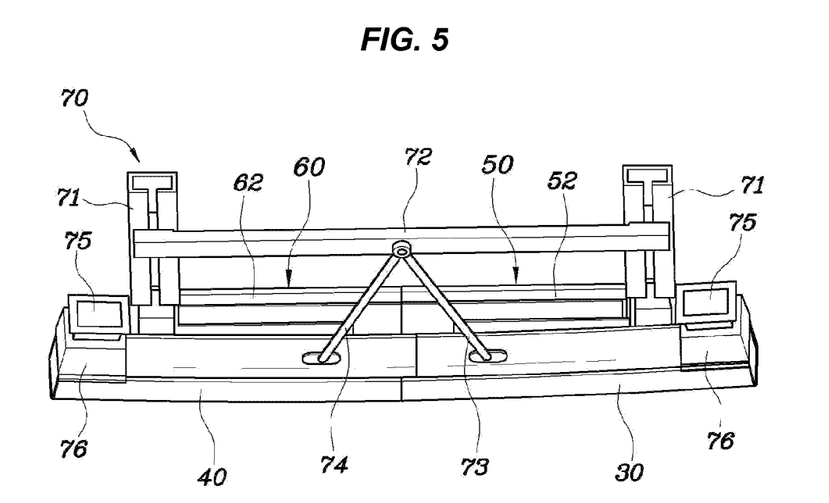

Further, in a right diagram of FIG. 3, and FIGS. 4 and 5, the left and right rear back beams 30 and 40 and the left and right storage boxes 50 and 60 are drawn out while sliding to the rear side of the vehicle from the rear bumper 21 and the shift bar 72 moves to the rear side on the guide rail 71 to maintain a state B of FIG. 3 and the frame case 76 moves to the rear side to maintain the contact with the rear stopper 77.

That is, when the locking device is cancelled and thereafter, the left and right storage boxes 50 and 60 stored in the inner space 22 of the rear bumper 21 are pulled to the rear side of the vehicle, the shift bar 72 which is positioned at location A of FIG. 3 moves to the rear side on the guide rail 71 to be positioned at location B of FIG. 3 and at the same time, the frame case 76 contacting the front stopper 78 moves to the rear side to contact the rear stopper 77.

When the shift bar 72 moves to the rear side, the left and right links 73 and 74 transfer force at that time to the left and right rear back beams 30 and 40, and as a result, the left and right rear back beams 30 and 40 and the left and right storage boxes 50 and 60 move to the rear side together.

When the left and right rear back beams 30 and 40 move to the rear side, the frame case 76 connected with the left and right rear back beams 30 and 40 via the back beam flanges 31 and 41 and the case flange 76a moves to the rear side on the fixation frame 75 to contact the rear stopper 77.

As described above, the shift bar 72 moves to the rear side from location A to location B of FIG. 3 and at the same time, when the frame case 76 moves to the rear side to contact the rear stopper 77, both the left and right rear back beams 30 and 40 and the left and right storage boxes 50 and 60 that are stored in the inner space 22 of the rear bumper 21 move to the rear side to be draw out from the rear bumper 21.

As shown in the right diagram of FIG. 3, when the shift bar 72 further moves to the rear side continuously while the left and right rear back beams 30 and 40 and the left and right storage boxes 50 and 60 are drawn out to the rear side, the left and right links 73 and 74 transfer the shift force of the shift bar 72 to the left and right rear back beams 30 and 40 to move the left and right rear back beams 30 and 40 to the rear side, but in this case, since the frame case 76 is suspended on the rear stopper 77, the left and right rear back beams 30 and 40 cannot move to the rear side any longer.

Figure 8:
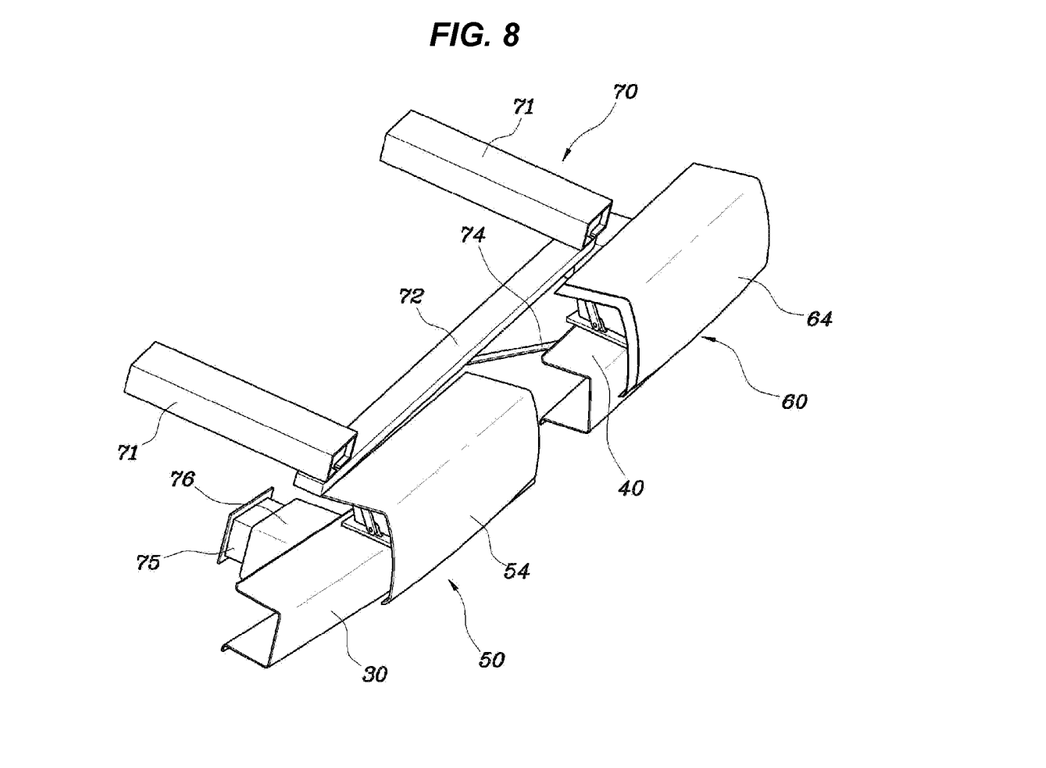
FIGS. 8 and 9 are a perspective view and a plan view of the case where the storage box is extended horizontally while the storage apparatus is according to the exemplary embodiment of the present invention is drawn out to the rear side.
Figure 9:
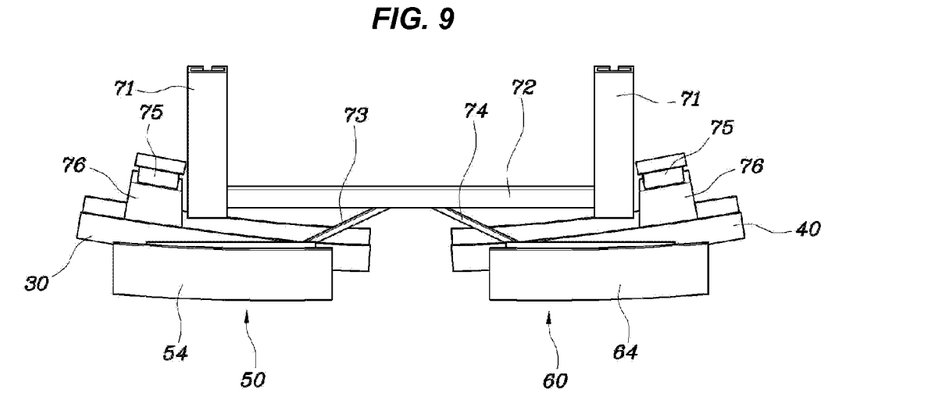

However, the left and right links 73 and 74 are further extended in the left and right directions, respectively by the rear shift force of the shift bar 72, and as a result, the left and right rear back beams 30 and 40 coupled with the left and right links 73 and 74 are extended while sliding in the left and right directions of the vehicle, respectively as shown in FIGS. 8 and 9 and the left and right storage boxes 50 and 60 coupled onto the left and right rear back beams 30 and 40 are also extended while moving in the left and right direction together.

In addition, when the lower trays 52 and 62 are opened by rotating the tray covers 54 and 64 and the upper trays 53 and 63 to the rear side as shown in FIG. 10 in the left and right storage boxes 50 and 60 that are extended while sliding in the left and right directions, the articles stored in the lower trays 52 and 62 may be taken out and used or a new article may be stored in the lower trays 52 and 62.

In addition, by opening the side surfaces of the left and right storage boxes 50 and 60 in the left and right directions, which face each other, an article having a large length, such as an umbrella or a golf club may be easily stored by using the left and right storage boxes 50 and 60 that are extended.

Further, in the exemplary embodiment, when the lower trays 52 and 62 are opened by rotating the tray covers 54 and 64 to the rear side as shown in FIG. 10, the tray covers 54 and 64 may be used as the step or bench or the article may be seated on the tray covers 54 and 64.

As described above, in the exemplary embodiment of the present invention, the storage apparatus is installed by using the inner space 22 of the rear bumper 21 corresponding to the spare space of the vehicle to maximize the spatial utilization of the vehicle, thereby improving the merchantability of the vehicle.

Further, in the storage apparatus according to the exemplary embodiment of the present invention, the left and right storage boxes 50 and 60 that are drawn out to the rear side of the vehicle are extended in the left and right directions of the vehicle and thereafter, the long article can also be easily stored by using the left and right storage boxes 50 and 60, and as a result, the utilization of the storage boxes can be maximized.

In addition, according to the exemplary embodiment of the present invention, the tray covers 54 and 64 can be used as the step or bench or the article can be seated on the opened tray covers 54 and 64 at the time of opening the left and right storage boxes 50 and 60.

According to an exemplary embodiment of the present invention, a storage apparatus is installed by using an inner space in a rear bumper corresponding to a spare space of a vehicle, such that spatial utilization of the vehicle can be maximized and in particular, an article having a large length can be stored by extending left and right storage boxes which are drawn out box horizontally and furthermore, when the left and right storage boxes are opened, a tray cover is used as a step or a bench or the article can be seated on the opened tray cover, thereby significantly improving the merchantability of the vehicle.

For convenience in explanation and accurate definition in the appended claims, the terms "upper", "lower", "inner", "outer", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A storage apparatus for a vehicle, comprising:
    a left rear back beam and a right rear back beam that are slidably coupled to a rear side member such that the left rear back beam and the right rear back beam are divided while sliding on the rear side member to left and right sides in a traverse direction of the vehicle, respectively when the left rear back beam and the right rear back beam are drawn out from a rear bumper while sliding to a rear side of the vehicle in a longitudinal direction thereof;
    a left storage box and a right storage box installed to be fixed to the left and right rear back beams, respectively, to be drawn out together when the left and right rear back beams are drawn out to the rear side of the vehicle and divided together when the left and right rear back beams slide to the left and right sides of the vehicle; and
    a power transmitting device;
    wherein the left rear back beam and the right rear back beam are pivotally coupled to the power transmitting device; and
    wherein the power transmitting device is configured to translate in the forward and backward directions of the vehicle and actuates the left and right rear back beams to slide in forward and backward directions of the vehicle and to pivot in the left and right sides of the vehicle, in accordance with forward and backward translating motion of the power transmitting device.

2. The storage apparatus for the vehicle of claim 1, wherein the left and right storage boxes include:
    lower plates fixed onto the left and right rear back beams, respectively;
    lower trays fixed onto the lower plates and having a space for storing articles, which is provided therein;
    upper trays rotatably coupled to the lower tray to open/close the lower trays; and
    tray covers integrally coupled to the upper trays.

3. The storage apparatus for the vehicle of claim 2, further comprising a plurality of link members of which both ends are hinge-coupled to both sides of the lower trays and the upper trays, respectively.

4. The storage apparatus for the vehicle of claim 1, wherein the power transmitting device includes:
    a pair of guide rails installed to be fixed onto a bottom surface of a rear floor panel at the left and right sides of the vehicle, respectively;
    a shift bar installed with both ends coupled to the pair of guide rails and being slidable in forward and backward directions on the pair of guide rails;
    a left link and a right link of which ends are hinged-coupled to the shift bar and the other ends are hinge-coupled to the left and right rear back beams, respectively;
    a pair of fixation frames integrally coupled to a rear end of the rear side member in the longitudinal direction of the rear side member;
    a pair of frame cases installed to slidably cover the fixation frames and slidably connected with the left and right rear back beams, respectively to move in the forward and backward direction on the fixation frames when the left and right rear back beams slide in the forward and backward directions and guide the left and right-direction slidings of the left and right rear back beams when the left and right rear back beams slide in the left and right directions on the frame cases; and
    a rear stopper integrally protruded on a side surface of the fixation frames and restraining rear movement of the frame cases.

5. The storage apparatus for the vehicle of claim 4, wherein the ends of the left and right links are hinge-coupled to a middle point of the shift bar and the other ends of the left and right links are installed to be hinge-coupled to the left and right rear back beams, respectively while maintaining the wider interval than the ends.

6. The storage apparatus for the vehicle of claim 5, wherein the left rear back beam and the right rear back beam are bent with a predetermined curvature with respect to the middle point of the shift bar.

7. The storage apparatus for the vehicle of claim 4, wherein a front stopper restraining a front movement of the frame cases integrally protrudes on a front end of the fixation frames.

8. The storage apparatus for the vehicle of claim 4, wherein:
    back beam flanges bent in upper and lower direction are integrally formed on upper and lower ends of the left and right rear back beams, respectively; and
    a case flange slidably covering the back beam flanges is integrally formed on upper and lower ends of the frame case to guide the left and right-direction slidings of the left and right rear back beams.

9. The storage apparatus for the vehicle of claim 2, wherein the tray covers that rotate to the rear side of the vehicle are usable as a step or a bench.

* * * * *